United States Patent
Chhabra

(10) Patent No.: US 8,976,721 B1
(45) Date of Patent: *Mar. 10, 2015

(54) BEACON MISS PREVENTION IN POWER SAVE MODES USING TIMING SYNCHRONIZATION FUNCTION

(71) Applicant: Marvell International Ltd., Hamilton (BM)

(72) Inventor: Kapil Chhabra, Milpitas, CA (US)

(73) Assignee: Marvell International Ltd., Hamilton (BM)

(*) Notice: Subject to any disclaimer, the term of this patent is extended or adjusted under 35 U.S.C. 154(b) by 112 days.

This patent is subject to a terminal disclaimer.

(21) Appl. No.: 13/747,179

(22) Filed: Jan. 22, 2013

Related U.S. Application Data

(63) Continuation of application No. 13/447,437, filed on Apr. 16, 2012, now Pat. No. 8,358,642, which is a continuation of application No. 12/008,963, filed on Jan. 15, 2008, now Pat. No. 8,160,045.

(60) Provisional application No. 60/884,946, filed on Jan. 15, 2007.

(51) Int. Cl.
*H04W 52/00* (2009.01)
*H04W 52/02* (2009.01)

(52) U.S. Cl.
CPC ................................ *H04W 52/0209* (2013.01)
USPC ........................................................ 370/311

(58) Field of Classification Search
None
See application file for complete search history.

(56) References Cited

U.S. PATENT DOCUMENTS

| | | | |
|---|---|---|---|
| 8,160,045 B1 * | 4/2012 | Chhabra | 370/342 |
| 8,358,642 B1 * | 1/2013 | Chhabra | 370/342 |
| 2002/0123345 A1 | 9/2002 | Mahany et al. | |
| 2005/0153751 A1 | 7/2005 | Bultan et al. | |
| 2006/0159053 A1 | 7/2006 | Donovan | |
| 2007/0091934 A1 | 4/2007 | Myles et al. | |
| 2007/0184835 A1 | 8/2007 | Bitran et al. | |
| 2007/0242645 A1 | 10/2007 | Stephenson et al. | |

(Continued)

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

(Continued)

*Primary Examiner* — John Blanton

(57) ABSTRACT

A clock generator generates a first clock. A receiver transitions, based on the first clock, from a power save mode to an active mode to receive a DTIM beacon from an access point. The DTIM beacon is transmitted at a DTIM beacon interval based on a second clock of the access point. A beacon sensing module determines a number of times the DTIM beacon is missed by the receiver during a predetermined time period subsequent to the receiver transitioning from the power save mode to the active mode. A transmit module transmits a number of requests to the access point during a given DTIM beacon interval. The number of requests is based on the number of times the DTIM beacon is missed. A synchronization module receives information about the second clock from the access point and synchronizes the first clock to the second clock based on the information.

16 Claims, 11 Drawing Sheets

(56) References Cited

U.S. PATENT DOCUMENTS

2008/0080446 A1      4/2008    Chung
2008/0267159 A1    10/2008    Mattsson et al.

OTHER PUBLICATIONS

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11h™-2003 [Amendment to IEEE Std 802.11™, 1999 Edition (Reaff 2003) as amended by IEEE Stds 802.11a™-1999, 802.11b™-1999, 802.11b™-1999/Cor Jan. 2001, 802.11d™-2001, 802.11g™-2003]; IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.

* cited by examiner

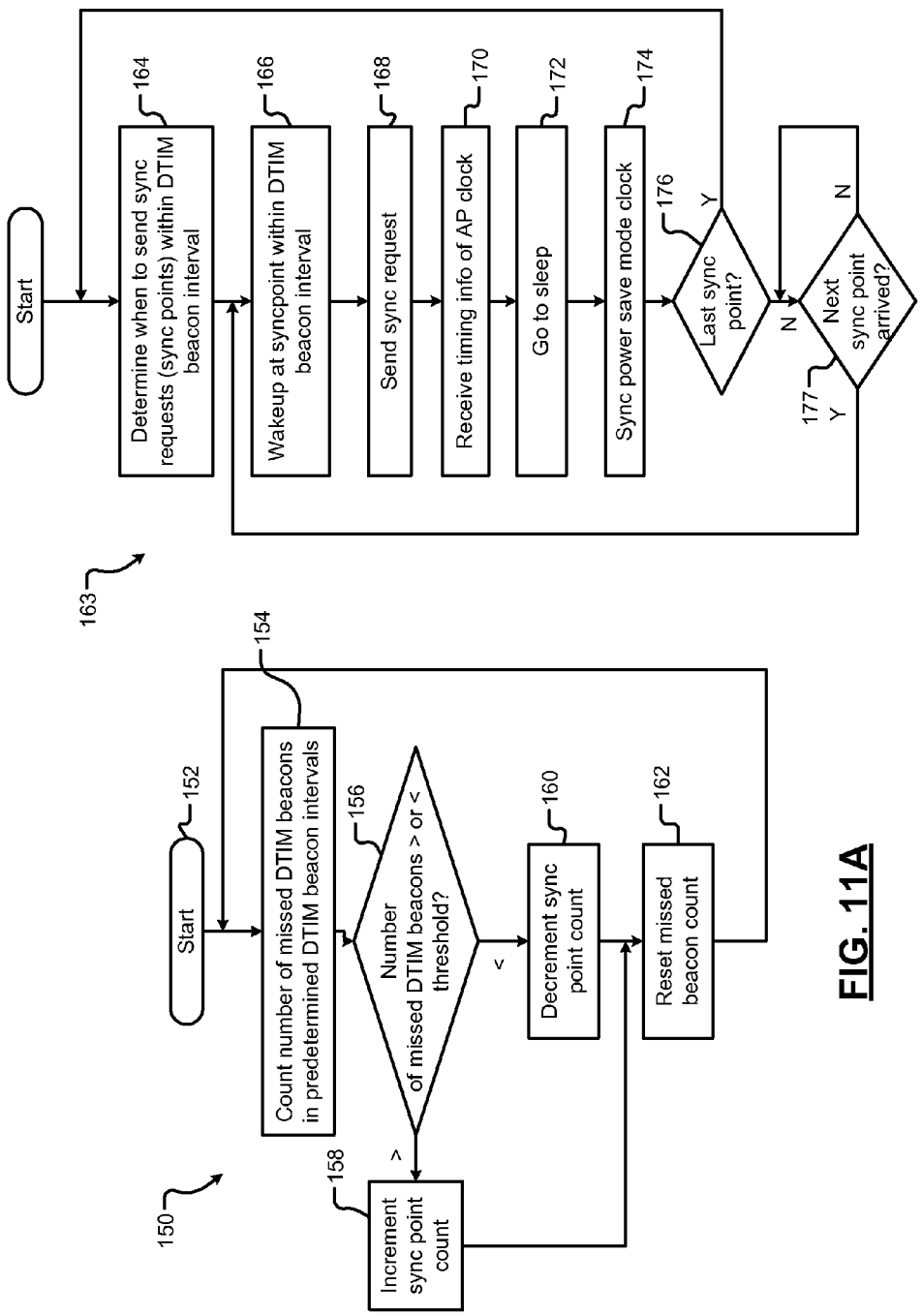

BEACON MISS PREVENTION IN POWER SAVE MODES USING TIMING SYNCHRONIZATION FUNCTION

CROSS-REFERENCE TO RELATED APPLICATIONS

This present disclosure is a continuation of U.S. patent application Ser. No. 13/447,437 (now U.S. Pat. No. 8,358,642), filed on Apr. 16, 2012, which is a continuation of U.S. patent application Ser. No. 12/008,963 (now U.S. Pat. No. 8,160,045), filed on Jan. 15, 2008, which claims the benefit of U.S. Provisional Application No. 60/884,946, filed on Jan. 15, 2007. The entire disclosures of the above referenced applications are incorporated herein by reference.

FIELD

The present disclosure relates to wireless networks, and more particularly to reducing power consumption of wireless network devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

IEEE sections 802.11, 802.11(a), 802.11(b), 802.11(g), 802.11(h), and 802.11(n) (collectively IEEE section 802.11), which are hereby incorporated by reference in their entirety, define ways for configuring wireless Ethernet networks and devices. According to IEEE section 802.11, wireless Ethernet network devices (hereinafter devices) may operate in an ad-hoc mode or an infrastructure mode.

Referring now to FIGS. 1 and 2, wireless Ethernet networks comprising devices communicating in ad-hoc and infrastructure modes are shown, respectively. In ad-hoc mode, each client station 10-1, 10-2, . . . , and 10-N (collectively client stations 10) communicates directly with other client stations without requiring an access point (AP). In infrastructure mode, each client station 20-1, 20-2, . . . , and 20-M (collectively client stations 20) communicates with other client stations through an AP 24. The AP 24 may provide a connection to a network 26, a server 28, and for the Internet 30.

Referring now to FIG. 3, the AP 24 transmits beacons at a programmable beacon interval. Every $N^{th}$ beacon is a delivery traffic indication message (DTIM) beacon, where N is an integer greater than or equal to 1. The AP 24 transmits DTIM beacons at a DTIM beacon interval, where the DTIM beacon interval is equal to N beacon intervals. The DTIM beacon is followed by buffered broadcast and multicast frames transmitted by the AP 24 to the client stations 20.

Generally, the AP 24 and the client stations 20 do not exchange data at all times. Accordingly, client stations 20 may operate in two modes: an active mode and a low power or standby mode called a power save mode. When the AP 24 and the client stations 20 exchange data, the client stations 20 may operate in the active mode. On the other hand, when the AP 24 and the client stations 20 do not exchange data, the client stations 20 may operate in the power save mode to conserve power. Based on the DTIM beacon interval, the client stations 20 may determine the duration of time to remain in the power save mode before waking up to receive a next DTIM beacon.

Referring now to FIG. 4, power save modes provided by IEEE section 802.11 include legacy power save and unscheduled automatic power save delivery (UAPSD) modes. When operating in the UAPSD power save mode, the client stations 20 may transition from power save mode to active mode and back to power save mode during one or more service periods (SPs) in the DTIM beacon interval before waking up to receive the next DTIM beacon.

Referring now to FIG. 5, a wireless Ethernet network device 31 (e.g., the client station 20) may be implemented by a system-on-chip (SOC) circuit 40. Typically, the SOC 40 includes one or more processors 42 (e.g., an advanced RISC machine (ARM) processor), a medium access controller (MAC) device 44, a baseband processor (BBP) 46, and a host interface (e.g., a peripheral component interface (PCI)) (not shown). The SOC 40 may communicate with a radio frequency (RF) transceiver 48. In some implementations, the SOC 40 may include the RF transceiver 48. The transceiver 48 communicates with an antenna 49. The wireless Ethernet network device (hereinafter device) 31 transmits and receives data to and from other devices via the RF transceiver 48 and the antenna 49.

The MAC device 44 selects the mode of operation of the BBP 46 and the RF transceiver 48. For example, when the device 31 exchanges data with other devices, the MAC device 44 may instruct the BBP 46 and the RF transceiver 48 to operate in the active mode. On the other hand, when the device 31 does not exchange data with other devices, the MAC device 44 may instruct the BBP 46 and the RF transceiver 48 to operate in the power save mode to conserve power.

SUMMARY

A system comprises a receive module that transitions from a power save mode to an active mode based on a first clock to receive a delivery traffic indication message (DTIM) beacon. A beacon sensing module senses a first number of DTIM beacons missed by the receive module during a first predetermined period. A control module selectively adjusts the first clock when the first number is greater than a first threshold.

In other features, the first predetermined period is an integer multiple of a DTIM beacon interval. The control module generates a second number of synchronization requests during a DTIM beacon interval after the first predetermined period to adjust the first clock. The control module increments the second number when the first number is greater than the first threshold and decrements the second number when the first number is less than the first threshold. The control module receives data related to a second clock of an access point (AP) from the AP in response the synchronization requests, updates a timing synchronization function (TSF) based on the data, and generates an updated TSF.

In other features, the control module generates the synchronization requests within a service period (SP) of an unscheduled automatic power save delivery (UAPSD) mode during the DTIM beacon interval. The control module generates the synchronization requests when a non-DTIM beacon is not received within a second predetermined period during the DTIM beacon interval. A clock module generates the first clock, that synchronizes the first clock to the second clock based on the updated TSF, and that generates a synchronized first clock. The first number decreases when the receive module transitions from the power save mode to the active mode based on the synchronized first clock.

A system on chip (SOC) comprises the system and further comprises a medium access controller (MAC) device that communicates with the beacon sensing module and the control module. A baseband processor (BBP) communicates with the MAC device. A radio frequency (RF) transceiver communicates with the BBP. The clock module generates a third clock. The BBP and the RF transceiver operate in the power save and active modes based on the first and third clocks, respectively.

In other features, the RF transceiver includes the receive module and a transmit module that transmits the synchronization requests. The BBP and the RF transceiver transition from the power save mode to the active mode when the control module generates the synchronization requests, from the active mode to the power save mode after the control module receives the data, and from the power save mode to the active mode based on the synchronized first clock. The first number decreases when the BBP and RF transceiver transition from the power save mode to the active mode based on the synchronized first clock.

A wireless Ethernet network device comprises the system and further comprising a transmitter module.

A method comprises transitioning a receive module from a power save mode to an active mode based on a first clock to receive a delivery traffic indication message (DTIM) beacon; sensing a first number of DTIM beacons missed by the receive module during a first predetermined period; and selectively adjusting the first clock when the first number is greater than a first threshold.

In other features, the first predetermined period is an integer multiple of a DTIM beacon interval. The method further comprises generating a second number of synchronization requests during a DTIM beacon interval after the first predetermined period to adjust the first clock. The method further comprises incrementing the second number when the first number is greater than the first threshold and decrements the second number when the first number is less than the first threshold. The method further comprises receiving data related to a second clock of an access point (AP) from the AP in response the synchronization requests, updates a timing synchronization function (TSF) based on the data, and generates an updated TSF.

In other features, the method further comprises generating the synchronization requests within a service period (SP) of an unscheduled automatic power save delivery (UAPSD) mode during the DTIM beacon interval. The method further comprises generating the synchronization requests when a non-DTIM beacon is not received within a second predetermined period during the DTIM beacon interval. The method further comprises synchronizing the first clock to the second clock based on the updated TSF; and generating a synchronized first clock. The method further comprises decreasing the first number when the receive module transitions from the power save mode to the active mode based on the synchronized first clock.

A computer program stored on a computer-readable medium comprises transitioning a receive module from a power save mode to an active mode based on a first clock to receive a delivery traffic indication message (DTIM) beacon; sensing a first number of DTIM beacons missed by the receive module during a first predetermined period; and selectively adjusting the first clock when the first number is greater than a first threshold.

In other features, the first predetermined period is an integer multiple of a DTIM beacon interval. The computer program further comprises generating a second number of synchronization requests during a DTIM beacon interval after the first predetermined period to adjust the first clock. The computer program further comprises incrementing the second number when the first number is greater than the first threshold and decrements the second number when the first number is less than the first threshold. The computer program further comprises receiving data related to a second clock of an access point (AP) from the AP in response the synchronization requests, updates a timing synchronization function (TSF) based on the data, and generates an updated TSF.

In other features, the computer program further comprises generating the synchronization requests within a service period (SP) of an unscheduled automatic power save delivery (UAPSD) mode during the DTIM beacon interval. The computer program further comprises generating the synchronization requests when a non-DTIM beacon is not received within a second predetermined period during the DTIM beacon interval. The computer program further comprises synchronizing the first clock to the second clock based on the updated TSF; and generating a synchronized first clock. The computer program further comprises decreasing the first number when the receive module transitions from the power save mode to the active mode based on the synchronized first clock.

In still other features, the systems and methods described above are implemented by a computer program executed by one or more processors. The computer program can reside on a computer readable medium such as but not limited to memory, non-volatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 11A and 11B are flowcharts of an exemplary method for decreasing probability of missing DTIM beacons according to the present disclosure.

DETAILED DESCRIPTION

Figure 1:
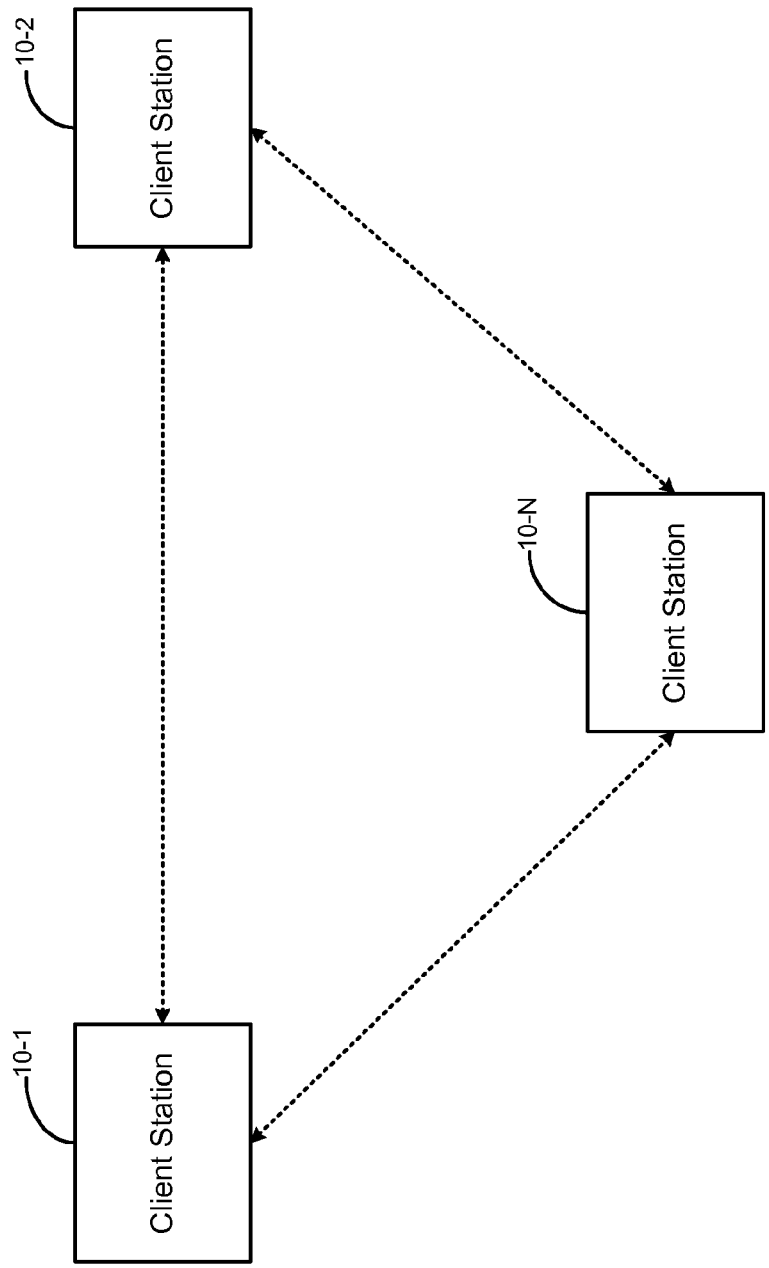
FIG. 1 is a functional block diagram of an exemplary wireless Ethernet network in ad-hoc mode according to the prior art.
Figure 2:
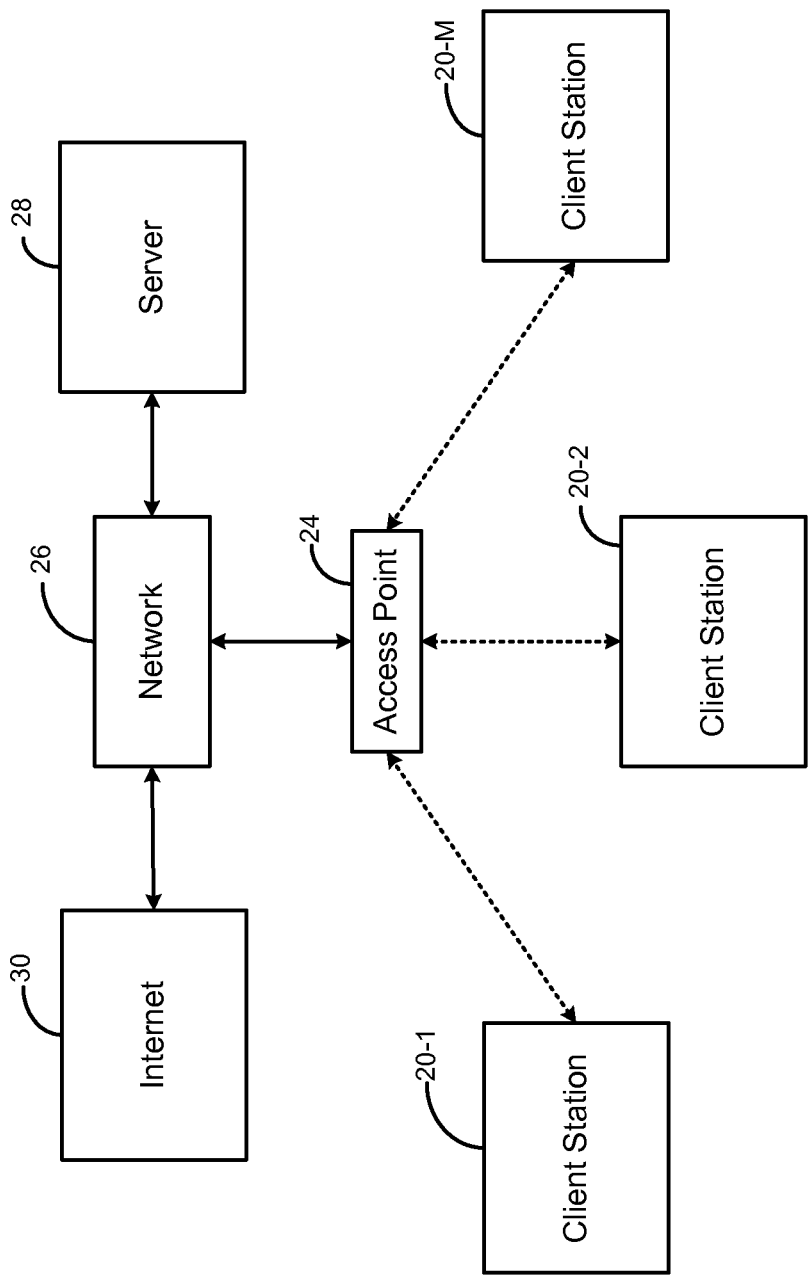
FIG. 2 is a functional block diagram of an exemplary wireless Ethernet network in infrastructure mode according to the prior art.
Figure 3:
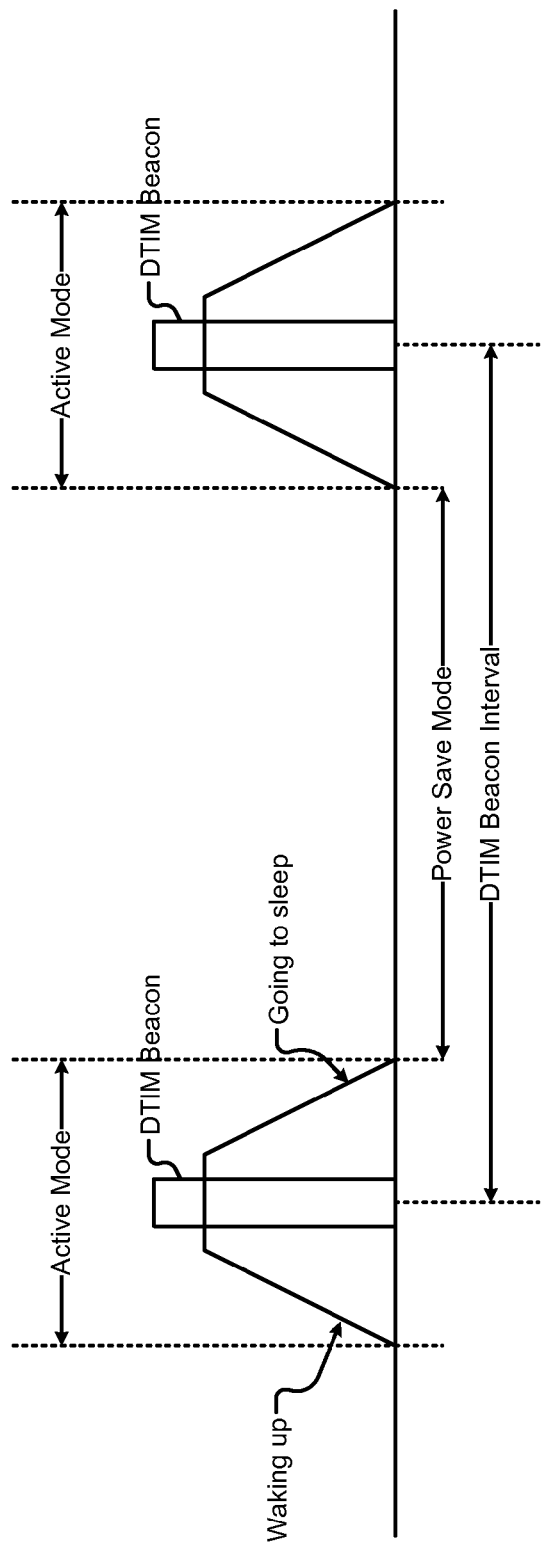
FIG. 3 is an exemplary timing diagram showing active and power save modes of a wireless Ethernet network device (device) and delivery traffic indication message (DTIM) beacons received in the active mode.
Figure 4:
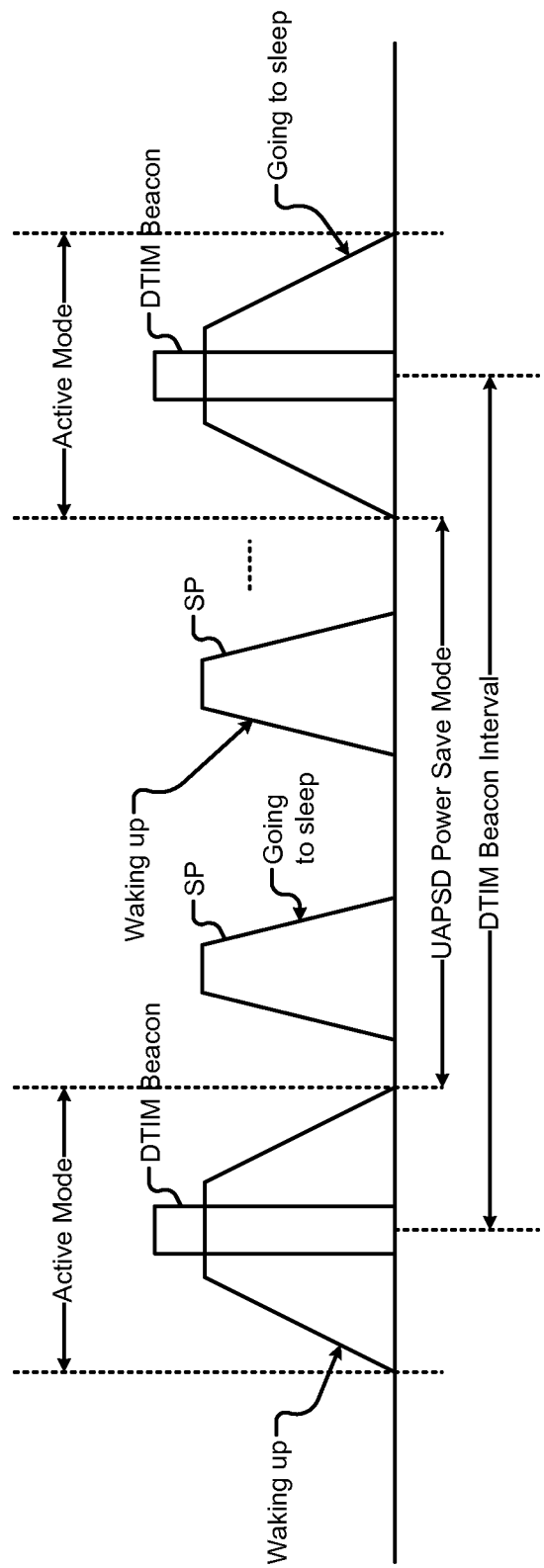
FIG. 4 is an exemplary timing diagram showing active and unscheduled automatic power save delivery (UAPSD) power save modes of a device and DTIM beacons received in the active mode.
Figure 5:
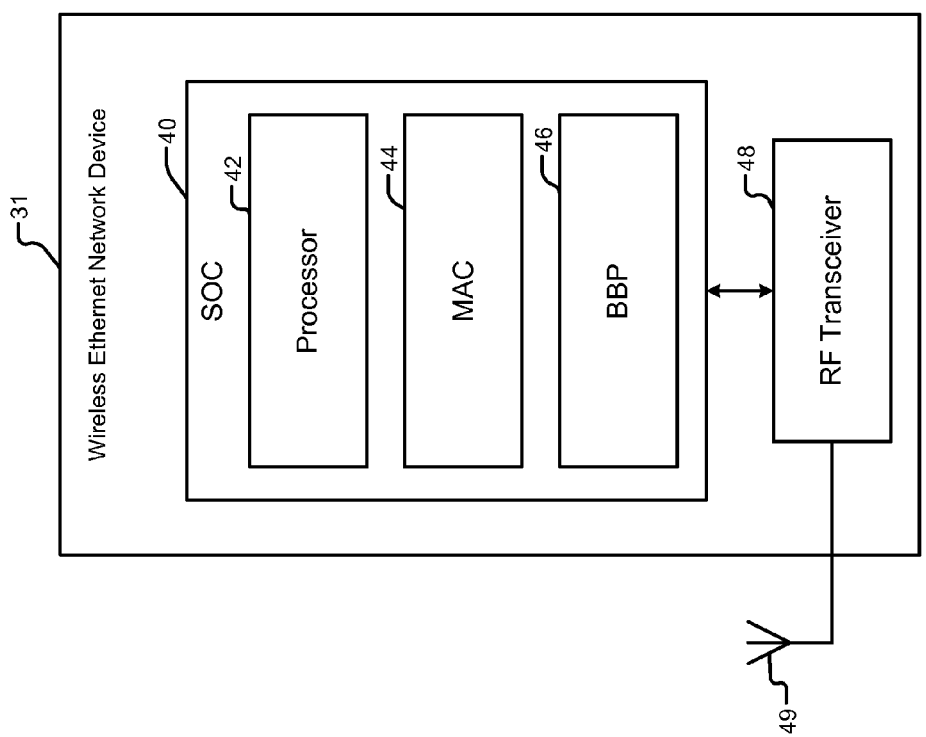
FIG. 5 is a functional block diagram of an exemplary device implemented by a system-on-chip (SOC)

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, and/or a combinational logic circuit.

Figure 6:
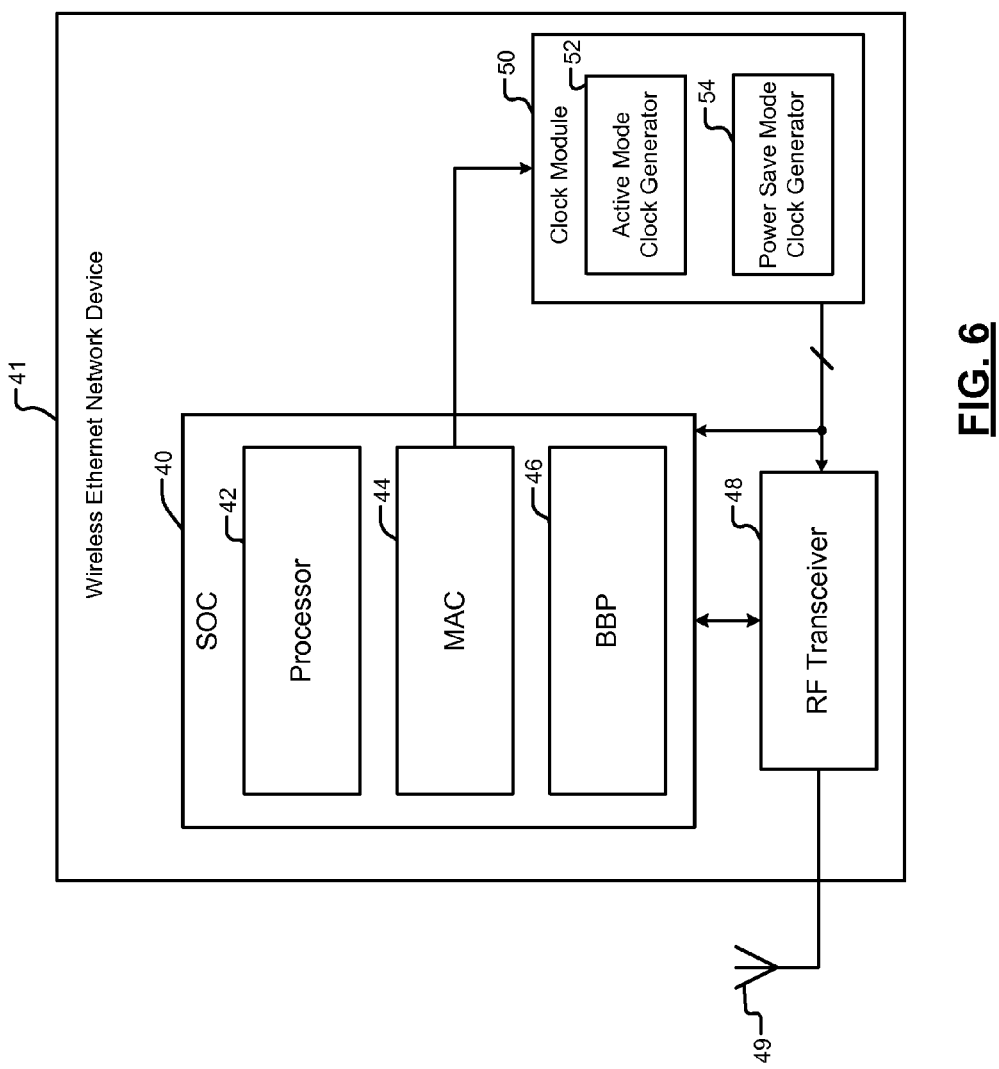
FIG. 6 is a functional block diagram of an exemplary device implemented by a system-on-chip (SOC)

Referring now to FIG. 6, a wireless Ethernet network device (hereinafter device) 41 may use a different clock when operating in the active mode than when operating in the power save mode. Specifically, the device 41 may comprise a clock module 50 that generates two clocks: an active mode clock and a power save mode clock. The clock module 50 may include an active mode clock generator 52 that generates the active mode clock and a power save mode clock generator 54 that generates the power save mode clock. Depending on the mode selected by the MAC device 44, the BBP 46 and the transceiver 48 may use the active mode clock or the power save mode clock. In some implementations, the SOC 40 may include the clock module 50.

The device 41 may receive the delivery traffic indication message (DTIM) beacons if the device 41 wakes up when the AP 24 transmits the DTIM beacons. The device 41 may wakeup when the AP 24 transmits the DTIM beacons if the power save mode clock of the device 41 is synchronized to a system clock of the access point (AP) 24. The DTIM beacons include timing information of the system clock of the AP 24. The device 41 uses the timing information to update a timing synchronization function (TSF) that synchronizes the power save mode clock of the device 41 to the system clock of the AP 24.

The power save mode clock, however, is generally less accurate than the active mode clock. This is because the power save mode clock is typically generated using a ring oscillator, which is sensitive to changes in power supply voltage and/or temperature of the device 41. Consequently, the power save mode clock can frequently lose synchronization to the system clock of the AP 24.

Figure 7:
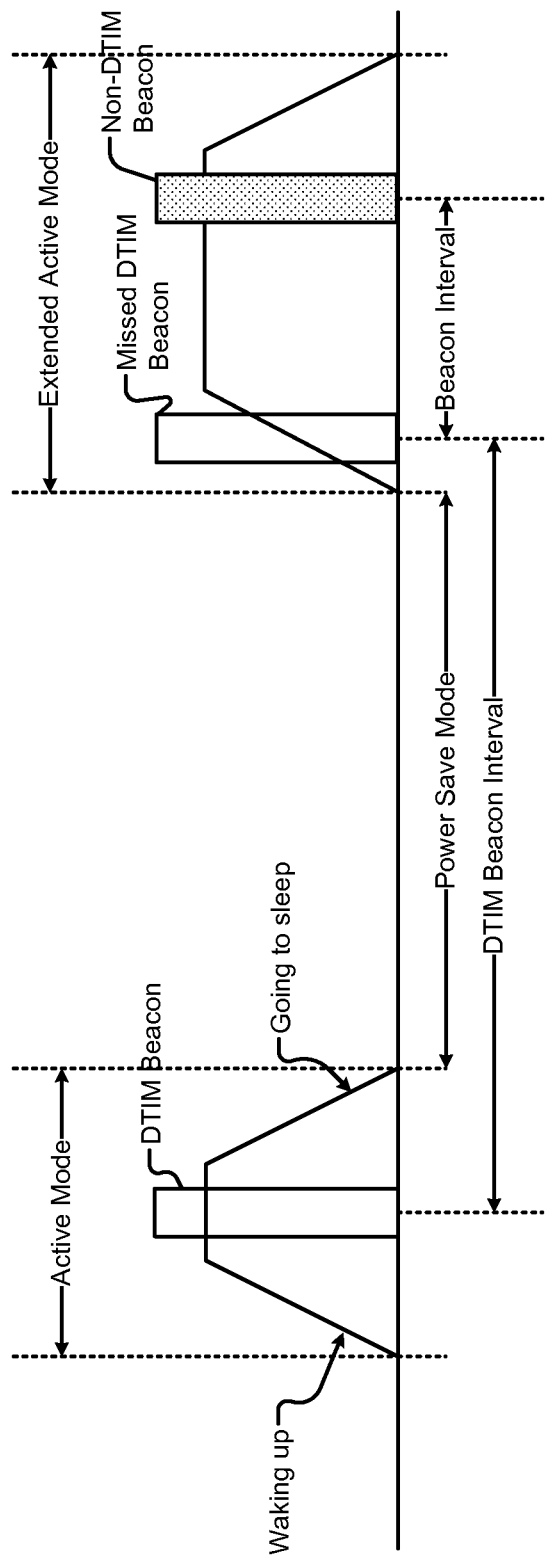
FIG. 7 is an exemplary timing diagram showing active and power save modes of a device and delivery traffic indication message (DTIM) beacons missed in the active mode.
Figure 8:
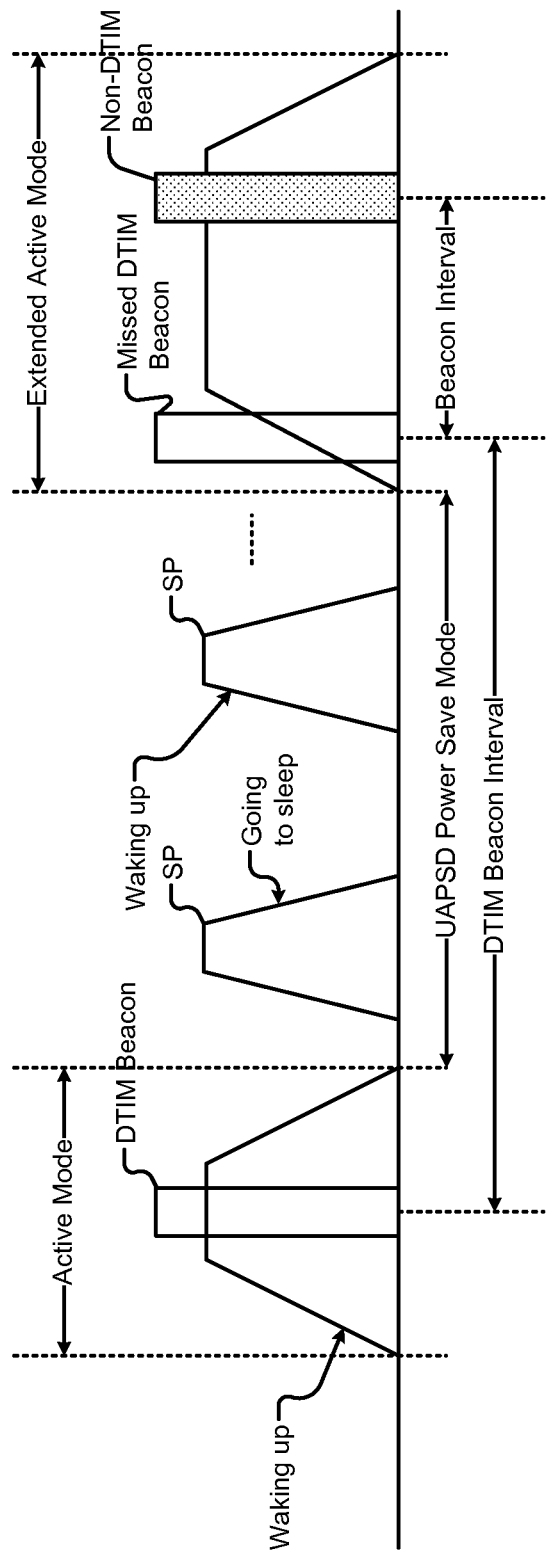
FIG. 8 is an exemplary timing diagram showing active and unscheduled automatic power save delivery (UAPSD) power save modes of a device and DTIM beacons missed in the active mode.

Referring now to FIGS. 7 and 8, when the power save mode clock of the device 41 is not synchronized to the system clock of the AP 24, the device 41 may wakeup at incorrect times and miss DTIM beacons. When the device 41 misses a DTIM beacon, the device 41 may stay awake for an extended period of time until a next beacon is received. Staying awake for an extended period of time can increase power consumption of the device 41.

The present disclosure relates to reducing power consumption of wireless Ethernet network devices by decreasing the probability of missing DTIM beacons. The probability of missing the DTIM beacons can be decreased by re-synchronizing the power save mode clock as follows.

Figure 9:
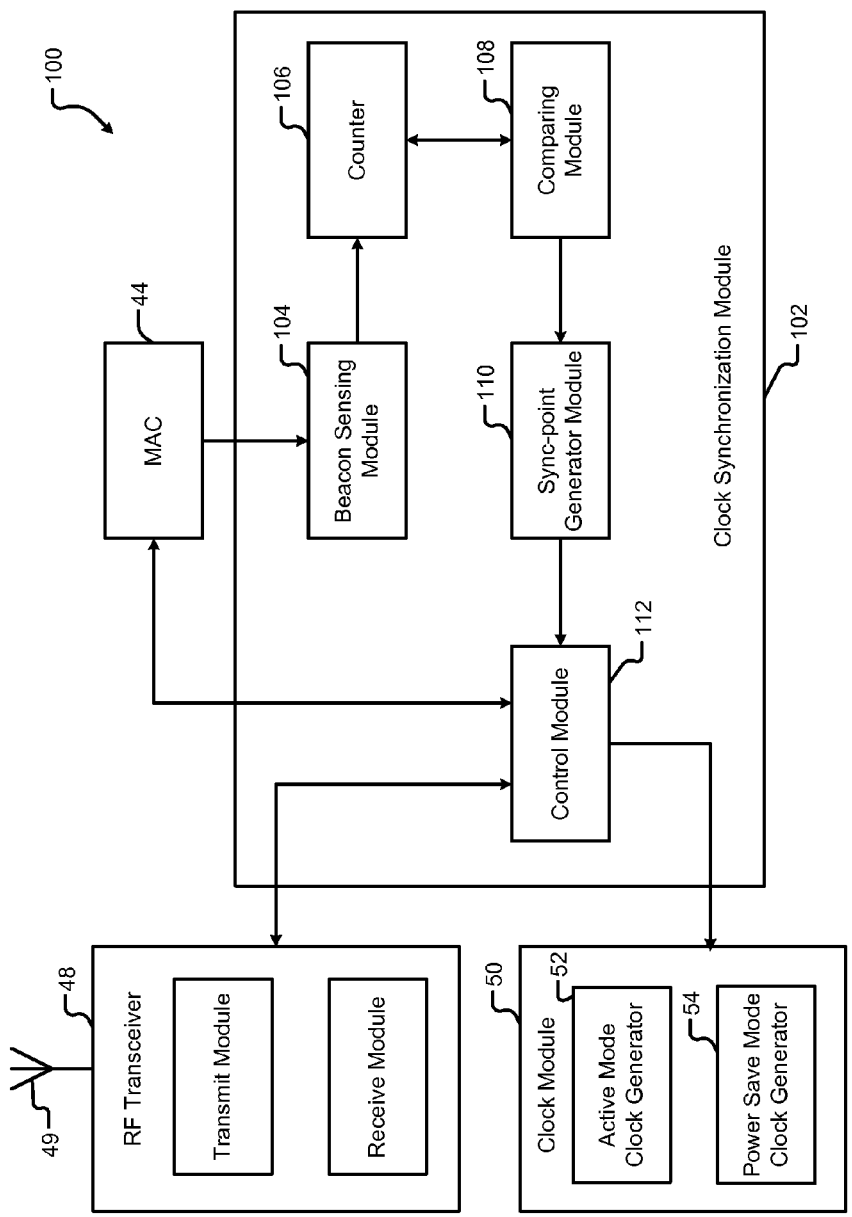
FIG. 9 is a functional block diagram of an exemplary system for decreasing probability of missing DTIM beacons according to the present disclosure.
Figure 10:
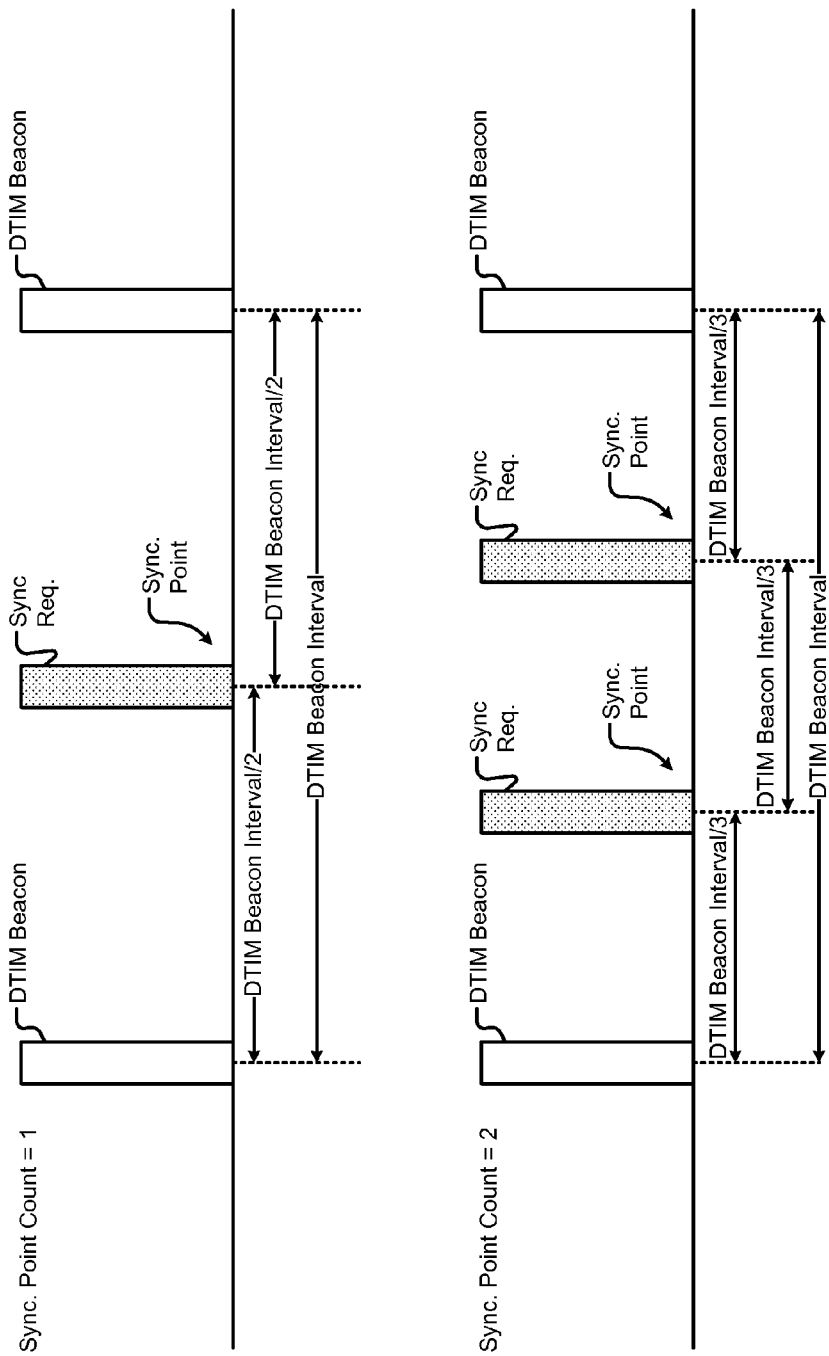
FIG. 10 is an exemplary timing diagram showing transmission of synchronization requests during a DTIM beacon interval according to the present disclosure.

Referring now to FIGS. 9 and 10, a system 100 for decreasing the probability of missing DTIM beacons is shown. In FIG. 9, the system 100 comprises a clock synchronization module 102, the MAC device 44, the transceiver 48, the antenna 49, and the clock module 50. The clock synchronization module 102 comprises a beacon sensing module 104, a counter 106, a comparing module 108, a sync-point generator module 110, and a control module 112. In some implementations, the MAC device 44 may include the clock synchronization module 102. Alternatively, the beacon sensing module 104 may implement the counter module 106, and the control module 112 may implement the comparing module 108 and the sync-point generator module 110.

The beacon sensing module 104 communicates with the MAC device 44. The MAC device 44 generates a control signal when a DTIM beacon is received during active mode (i.e., during a wake period). The beacon sensing module 104 determines that a DTIM beacon is missed during a wake period when the control signal is not received and the wake period is extended. The beacon sensing module 104 detects a number of DTIM beacons missed during wake periods over a predetermined number of adjacent DTIM beacon intervals. For example, the beacon sensing module 104 may detect the number of DTIM beacons missed during wake periods over 20 adjacent DTIM beacon intervals.

The beacon sensing module 104 generates a missed beacon signal each time a DTIM beacon is missed and outputs the missed beacon signal to the counter 106. The counter 106 increments a missed beacon count each time the missed beacon signal is received. At the end of the predetermined number of adjacent DTIM beacon intervals, the comparing module 108 compares the missed beacon count to a predetermined threshold. The comparing module 108 generates a control signal that indicates whether the missed beacon count is greater or less than the predetermined threshold. The comparing module 108 outputs the control signal to the sync-point generator module 110 and resets the missed beacon count to 0.

In some implementations, two thresholds may be used. For example, the comparing module 108 may generate a first control signal when the missed DTIM count is greater than a first predetermined threshold. The comparing module 108 may generate a second control signal when the missed DTIM count is less than a second predetermined threshold. The comparing module 108 may output the first and second control signals to the sync-point generator module 110.

The sync-point generator module 110 increments a synchronization point count when the control signal from the comparing module 108 indicates that the missed beacon count is greater than the predetermined threshold (or the first predetermined threshold). The sync-point generator module 110 decrements the synchronization point count when the control signal from the comparing module 108 indicates that the missed beacon count is less than the predetermined threshold (or the second predetermined threshold).

The sync-point generator module 110 generates a number of synchronization points at which synchronization requests may be transmitted within a DTIM beacon interval. The synchronization points are given by $$K*DTIM \text{ beacon interval}/(\text{synchronization point count}+1)$$

where K is an integer, and 0<K<(synchronization point count+1). The sync-point generator module 110 outputs the synchronization point count to the control module 112 at the end of the predetermined number of adjacent DTIM beacon intervals.

The control module 112 generates a number of synchronization requests between two consecutive DTIM beacons (i.e., during one DTIM beacon interval) as shown in FIG. 10. The number of synchronization requests is equal to the synchronization point count.

More specifically, at each synchronization point, the control module 112 generates a resync control signal and outputs the resync control signal to the MAC device 44 and the transceiver 48. On receiving the resync control signal, the MAC device 44 instructs the BBP 46 (not shown) and the transceiver 48 to enter the active mode (i.e., to wakeup).

On receiving the resync control signal, a transmit module 48-1 of the transceiver 48 transmits a unicast probe request (i.e., a synchronization request) to the AP 24 (not shown). The AP 24 responds by transmitting a probe response that includes information of the system clock of the AP 24. A receive module 48-2 of the transceiver 48 receives the probe response and outputs the information of the system clock of the AP 24 to the control module 112.

The control module 112 updates the TSF based on the information of the system clock of the AP 24. The control module 112 outputs the updated TSF to the clock module 50. Based on the updated TSF, the power save mode clock generator 54 synchronizes the power save mode clock to the system clock of the AP 24.

The control module 112 determines an amount of time from the synchronization point to sleep (i.e., to remain in the power save mode) before waking for the next DTIM beacon based on the synchronized power save mode clock. The MAC device 44 instructs the BBP 46 and the transceiver 48 to transition from the active mode to the power save mode (i.e., to sleep).

The accuracy of synchronizing the power save mode clock increases with each synchronization request. Accordingly, the probability of missing a next scheduled DTIM beacon during a next wakeup period decreases with each synchronization request.

In some implementations, the control module 112 may generate the synchronization requests at times other than the synchronization points to minimize a number of additional wakeup cycles for synchronization purposes. By minimizing the number of additional wakeup cycles for synchronization purposes, the control module 112 may conserve power. A description of some exemplary implementations follows.

When in the UAPSD power save mode, the control module 112 may round off a synchronization point to a next service period (SP) within a DTIM beacon interval. That is, the control module 112 may defer transmitting a synchronization request until the next SP that is closest in time to the synchronization point within the DTIM beacon interval. The control module 112 may generate the synchronization request during the next SP.

Additionally or alternatively, the control module 112 may wait for a predetermined time to receive a next non-DTIM beacon within the DTIM beacon interval before transmitting a synchronization request. When the next non-DTIM beacon is received within the predetermined time, the control module 112 receives the information of the system clock of the AP 24 from the next non-DTIM beacon. The control module 112 may cancel transmission of the synchronization request.

The control module 112 may utilize other opportunities that provide the information of the system clock of the AP 24 and avoid waking up specifically to send a synchronization request. The control module 112 may overlap (i.e., coincide) the synchronization points with the other opportunities to minimize the number of wakeup cycles for synchronization purposes and conserve power.

Referring now to FIGS. 11A and 11B, methods 150 and 163 that are executed in parallel or concurrently are used to minimize the probability of missing DTIM beacons. In FIG. 11A, the number of missed DTIM beacons is tracked within a predetermined window and the number of synchronization points is adjusted. Concurrently, the control module schedules synchronization points based on the current value of sync point. While a parallel or concurrent arrangement is shown, a sequential arrangement may also be used.

In method 150, control begins at step 152. The beacon sensing module 104 detects the number of missed DTIM beacons during wake periods over the predetermined number of DTIM beacon intervals in step 154. The comparing module 108 determines in step 156 if the missed beacon count is greater or less than the predetermined threshold. In some implementations, comparing module 108 determines in step 156 if the missed beacon count is greater than the first predetermined threshold or less than the second predetermined threshold.

If the missed beacon count is greater than the predetermined threshold (or the first predetermined threshold), the sync-point generator module 110 increments the synchronization point count in step 158. If the missed beacon count is less than the predetermined threshold (or the second predetermined threshold), the sync-point generator module 110 decrements the synchronization point count in step 160. At the end of step 158 or step 160, the comparing module 108 resets the missed beacon count in step 162.

In FIG. 11B, the control module 112 determines when to send synchronization requests (i.e., locations of synchronization points) between adjacent DTIM beacons (i.e., in one DTIM beacon interval) in step 164. At a first synchronization point, the MAC device 44 instructs the BBP 46 and the transceiver 48 to wakeup at the sync point in step 166. At the first synchronization point, the transmit module 48-1 transmits the synchronization request (i.e., the unicast probe request) to the AP 24 in step 168.

The receive module 48-2 receives the probe response from the AP 24 that includes data related to the system clock of the AP 24 in step 170. The MAC device 44 instructs the BBP 46 and the transceiver 48 to switch to the power save mode in step 172. In step 174, the control module 112 updates the TSF, outputs the updated TSF to the clock module 50, and the clock module 50 synchronizes the power save mode clock to the system clock of the AP 24.

The control module 112 determines in step 176 if the synchronization point is the last synchronization point within the DTIM beacon interval. If the result of step 176 is false, the control module 112 determines in step 177 whether the time to transmit a next synchronization request has arrived. If the result of step 177 is false, the method 150 repeats step 177. If the result of step 177 is true, the method 150 returns to step 166. If the result of step 176 is true, the method 150 returns to step 154.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 293 may include an optical storage drive, such as a DVD drive, and/or a hard disk drive (HDD). The mobile device may include a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
a clock generator configured to generate a first clock;
a receiver configured to transition, based on the first clock, from a power save mode to an active mode to receive a delivery traffic indication message (DTIM) beacon from an access point, wherein the DTIM beacon is transmitted at a DTIM beacon interval based on a second clock associated with the access point;
a beacon sensing module configured to determine a number of times the DTIM beacon is missed by the receiver during a predetermined time period subsequent to the receiver transitioning from the power save mode to the active mode due to the first clock not being synchronized to the second clock;
a transmit module configured to transmit a number of requests to the access point during a given DTIM beacon interval, wherein the number of requests is based on the number of times the DTIM beacon is missed by the receiver during the predetermined time period; and
a synchronization module configured to
in response to the transmit module transmitting the requests during the given DTIM beacon interval, receive information about the second clock from the access point, and
synchronize the first clock to the second clock based on the information received from the access point.

2. The system of claim 1, further comprising a control module configured to, in response to the first clock being synchronized to the second clock, determine a duration of the power save mode for the receiver based on the first clock.

3. The system of claim 1, wherein the predetermined time period includes a predetermined number of DTIM beacon intervals.

4. The system of claim 1, wherein the receiver is configured to receive a beacon from the access point in accordance with a beacon interval, and wherein the DTIM beacon interval is greater than the beacon interval.

5. The system of claim 1, further comprising a control module configured to, during the given DTIM beacon interval, synchronize a time of transmission of one of the requests to a service period of an Unscheduled Automatic Power Save Delivery mode.

6. The system of claim 1, further comprising a control module configured to:
during the given DTIM beacon interval prior to the transmit module transmitting one of the requests to the access point during the given DTIM beacon interval, wait for a predetermined amount of time to receive a non-DTIM beacon from the access point; and
in response to the receiver receiving the non-DTIM beacon from the access point during the predetermined amount of time, (i) receive the information about the second clock from the non-DTIM beacon, (ii) synchronize the first clock to the second clock based on the information received from the non-DTIM beacon, and (iii) cancel transmission of the one of the requests to the access point during the given DTIM beacon interval.

7. The system of claim 1, wherein the synchronization module is configured to:
increase the number of requests to transmit to the access point in response to the number of times that a DTIM beacon is not received being greater than a first predetermined threshold; and
decrease the number of requests to transmit to the access point in response to the number of times that a DTIM beacon is not received being less than a second predetermined threshold.

8. The system of claim 7, wherein the first predetermined threshold is equal to the second predetermined threshold.

9. A method comprising:
generating a first clock;
transitioning a receiver, based on the first clock, from a power save mode to an active mode to receive a delivery traffic indication message (DTIM) beacon from an access point, wherein the DTIM beacon is transmitted at a DTIM beacon interval based on a second clock associated with the access point;
determining a number of times the DTIM beacon is missed by the receiver during a predetermined time period subsequent to the receiver transitioning from the power save mode to the active mode due to the first clock being not synchronized to the second clock;
transmitting a number of requests to the access point during a given DTIM beacon interval, wherein the number of requests is based on the number of times the DTIM beacon is missed by the receiver during the predetermined time period;
receiving information about the second clock from the access point in response to transmitting the requests during the given DTIM beacon interval; and
synchronizing the first clock to the second clock based on the information received from the access point.

10. The method of claim 9, further comprising, determining, in response to the first clock being synchronized to the second clock, a duration of the power save mode for the receiver based on the first clock.

11. The method of claim 9, wherein the predetermined time period includes a predetermined number of DTIM beacon intervals.

12. The method of claim 9, further comprising receiving, at the receiver, a beacon from the access point at a beacon interval, wherein the DTIM beacon interval is greater than the beacon interval.

13. The method of claim 9, further comprising synchronizing a time of transmission of one of the requests to a service period of an Unscheduled Automatic Power Save Delivery mode during the given DTIM beacon interval.

14. The method of claim 9, further comprising:
prior to transmitting one of the requests to the access point during the given DTIM beacon interval, waiting for a predetermined amount of time to receive a non-DTIM beacon from the access point during the given DTIM beacon interval; and
in response to receiving the non-DTIM beacon from the access point during the predetermined amount of time,
receiving the information about the second clock from the non-DTIM beacon,
synchronizing the first clock to the second clock based on the information received from the non-DTIM beacon, and
canceling transmission of the one of the requests to the access point during the given DTIM beacon interval.

15. The method of claim 9, further comprising:
- increasing the number of requests to transmit to the access point during the given DTIM beacon interval in response to the number of times that a DTIM beacon is not received being greater than a first predetermined threshold; and
- decreasing the number of requests to transmit to the access point during the given DTIM beacon interval in response to the number of times a DTIM beacon is not received being less than a second predetermined threshold.

16. The method of claim 15, wherein the first predetermined threshold is equal to the second predetermined threshold.

\* \* \* \* \*